UNITED STATES PATENT OFFICE.

RICHARD F. W. LOPER, OF PHILADELPHIA, PENNSYLVANIA, ASSIGNOR OF ONE-HALF TO CHARLES McKEENE, OF SAME PLACE.

COMPOSITION OF MATTER FOR THE MANUFACTURE OF ILLUMINATING-CANDLES.

SPECIFICATION forming part of Letters Patent No. 241,810, dated May 24, 1881.

Application filed February 14, 1881. (No specimens.)

*To all whom it may concern:*

Be it known that I, RICHARD F. W. LOPER, a citizen of the United States, residing at the city of Philadelphia, in the State of Pennsylvania, have invented a new and useful Composition of Matter to be used for the Manufacture of Illuminating-Candles, of which the following is a specification.

My composition consists of the following ingredients, viz: carbon oil, animal charcoal, and wax. I combine these ingredients in about the following proportions, to wit: carbon oil, 300° fire test, one part; animal charcoal, one part, and wax, two parts. These ingredients are mingled thoroughly by agitation, the wax having first been melted. The charcoal absorbs and holds the carbon oil, and the wax enables the composition to be molded into the proper shape for candles. There are several equivalents for wax which might be used for the same purpose—such as stearine, paraffine, spermaceti, tallow, &c.—and by the term "wax," as used above, I desire to cover its equivalents; but experimentally I find real wax to be the best adapted for a vehicle or body for the compound, and prefer it, therefore, to any named equivalent. I do not wish to confine myself strictly to the proportions named above of the respective ingredients, inasmuch as quality of material or climate may render some difference of proportion necessary; but I find the proportions cited satisfactory and prefer them to any other.

By the use of the above composition we combine the safe and handy properties of the illuminating-candle with the brilliancy of flame of the coal-oil lamp, thus obtaining a maximum of light with a minimum of danger, and avoiding those accidents which so frequently result from the use of lamps.

I am aware that wax has long been used as a material for constructing candles of; but I am not aware of its ever having been combined with animal charcoal and carbon oil, or either of them; nor do I know of any previous combination of animal charcoal with carbon oil.

What I claim, and desire to secure by Letters Patent, is—

1. The combination of animal charcoal and carbon oil with wax, as a composition of matter for making illuminating-candles.

2. The herein-described composition of matter to be used for the manufacture of candles, consisting of carbon oil, animal charcoal, and wax, in the proportions specified, or any modification of them.

RICHARD F. W. LOPER.

Witnesses:
CHAS. J. KLOPP,
B. F. WAGNER.